United States Patent
Lee

(10) Patent No.: US 7,342,931 B2
(45) Date of Patent: Mar. 11, 2008

(54) APPARATUS AND METHOD FOR ROUTING AN AAL5 PDU IN A MOBILE COMMUNICATION SYSTEM

(75) Inventor: Seung Young Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 892 days.

(21) Appl. No.: 10/703,668

(22) Filed: Nov. 10, 2003

(65) Prior Publication Data

US 2004/0105447 A1 Jun. 3, 2004

(30) Foreign Application Priority Data

Nov. 11, 2002 (KR) .................. 10-2002-0069631
Oct. 7, 2003 (KR) .................. 10-2003-0069598

(51) Int. Cl.
*H04L 12/56* (2006.01)

(52) U.S. Cl. .................. 370/397; 370/395.32

(58) Field of Classification Search ........... 370/395.32, 370/397, 230, 474, 392
See application file for complete search history.

(56) References Cited

U.S. PATENT DOCUMENTS

| | | | |
|---|---|---|---|
| 6,625,120 B1* | 9/2003 | Pillar et al. ........... | 370/230 |
| 6,760,305 B1* | 7/2004 | Pasternak et al. ...... | 370/230 |
| 6,920,142 B1* | 7/2005 | Hodgins et al. ........ | 370/397 |
| 7,142,564 B1* | 11/2006 | Parruck et al. ........ | 370/474 |
| 2002/0181463 A1* | 12/2002 | Knight ................ | 370/392 |

* cited by examiner

*Primary Examiner*—Chi Pham
*Assistant Examiner*—Albert T. Chou
(74) *Attorney, Agent, or Firm*—Ked & Associates, LLP

(57) ABSTRACT

Embodiments of the present invention relates to an apparatus and method for routing AAL5 PDU in a mobile communication system, capable of routing AAL5 PDU using a Hash lookup table.

15 Claims, 8 Drawing Sheets

APPARATUS AND METHOD FOR ROUTING AN AAL5 PDU IN A MOBILE COMMUNICATION SYSTEM

BACKGROUND OF THE INVENTION

1. Field of the Invention

Embodiments of the present invention generally relate to communications and/or electronics.

2. Background of the Related Art

Communication systems are used in everyday life. For example, telephone systems, the Internet, and wireless telephone systems are examples of commonly used communications systems. Often, these communication systems are digital communication systems. Digital communication systems communicate data from one place to another. Such data may be the content of a telephone conversation, contents of an Internet website, or a wireless telephone conversation.

In digital communication systems, information is converted into 1s and 0s and transmitted from one point to another. By converting data to 1s and 0s for communication, a greater level of quality and efficiency in communication may be accomplished. However, communication systems which transmit digital data must process these 1s and 0s very quickly so that the digital data (e.g. representing a telephone conversation) is sent from one person to another without a noticeable delay. As more and more people utilize communication systems, it may be complicated to route digital data without a noticeable delay. Accordingly, there is a continuing desire to minimize any time delay when transmitting and routing digital data.

For example, when a telephone conversation is transmitted between one person to another as digital data, it is very important that there is not a noticeable delay in the data. This can be appreciated, as a telephone conversation is a live communication and delay of what a person is saying to the other person may frustrate both parties of the conversation.

SUMMARY OF THE INVENTION

Embodiments of the present invention relate to routing a packet of data according to a Hashing function. In embodiments, a packet of data is digital data which may represent part of a telephone conversation. The speedy and efficient routing of the packet of data is important in a telephone conversation to avoid frustration of the two parties speaking. Accordingly, embodiments of the present invention utilize a Hashing function to improve the speed and efficiency of which the packet of data can be routed. In embodiments of the present invention, the routing of the packet of data according to a Hashing function is implemented in mobile communication systems (e.g. a cellular telephone network). In other embodiments of the present invention, the packet of data is a protocol data unit.

DETAILED DESCRIPTION OF PREFERRED EMBODIMENTS

Figure 1:
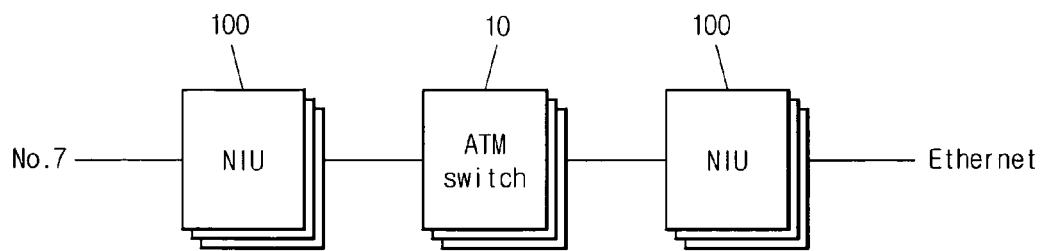
FIG. 1 is an exemplary illustrative view of a configuration of a mobile communication system using ATM.
Figure 2:
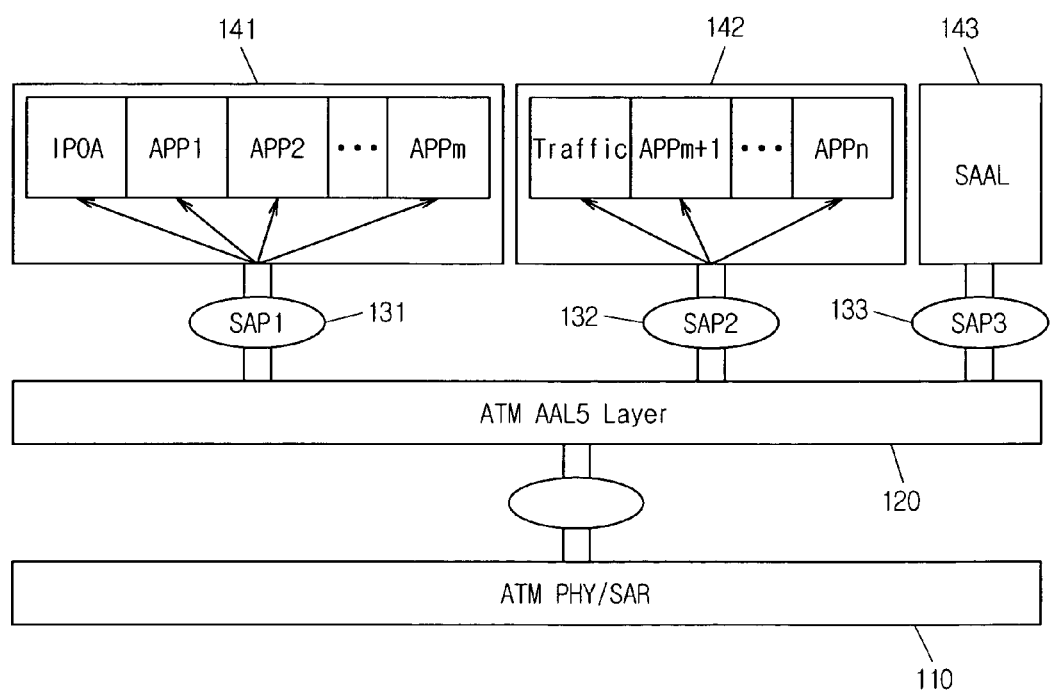
FIG. 2 illustratively shows an exemplary apparatus for routing an AAL5 PDU in a mobile communication system.

Embodiments of the present invention, as illustrated in exemplary FIG. 1, relates to a mobile communication system using Asynchronous Transfer Mode (ATM) as an internal network interface to communicate with other communication networks. For example, a No.7 signal network or an Ethernet network may communicate through a Network Interface Unit (NIU) 100 to exchange data with other communication networks via ATM switch 10. NIU 100, as illustrated in exemplary FIG. 2, may include at least one of an ATM Physical/Segmentation Assembly and Reassembly Sublayer (PHY/SAR) layer 110, an ATM AAL5 layer 120, a plurality of Service Access Points (SAPs) (131, 132, 133), and a plurality of upper layers. ATM PHY/SAR layer 110 may transmit and receive ATM cells. ATM Adaptation Layer Type 5 (ATM AAL5) layer 120 may format ATM cells received from ATM PHY/SAR layer 110 to the specific size of an AAL5 PDU and then may distribute the AAL5 Protocol Data Unit (PDU) to application programs of upper layers via SAP 131, 132, or 133.

Application programs may be grouped in groups of similar programs. For example, a first similar program group 141 may include IP over ATM (IPOA), a second similar program group 142 may include traffic (e.g. image, voice, etc.), or a third similar program group 143 may include Signaling AAL (SAAL). Similar program groups 141, 142, or 143 may be connected to SAP (131, 132, or 133) for receiving an AAL5 PDU transmitted from ATM AAL5 layer 120. When ATM AAL5 layer 120 receives an ATM cell from ATM PHY/SAR layer 110, it may convert the received ATM cell into AAL5 PDU format, identify a SAP to which the AAL5 PDU is transmitted and transmits the AAL5 PDU to the identified SAP. Identifying a SAP to which the AAL5 PDU is transmitted may use at least one of an IP address, a Virtual Path Identifier (VPI), a Virtual Channel Identifier (VCI), VPI/VCI which are ATM channel information, or any other equivalent identifier. There may be a variety of application programs (e.g. IPOA, APP1, APP2, . . . , APPm) in a single SAP. A SAP may identify an application program to which a received AAL5 PDU is transmitted, based on header information of AAL5 PDU received from the ATM AAL5 layer 120. A SAP may transmit a received AAL5 PDU to an identified application program.

Figure 3:
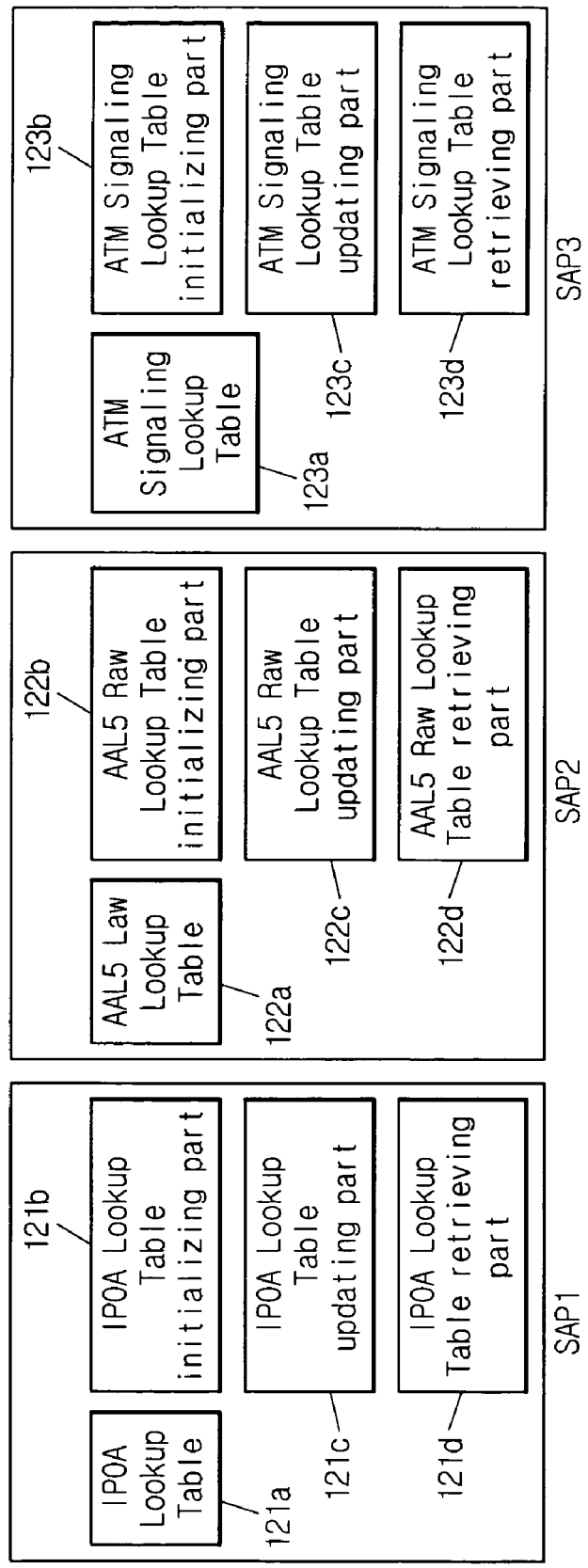
FIG. 3 is a view showing an exemplary configuration of an ATM AAL5 layer.
Figure 4:
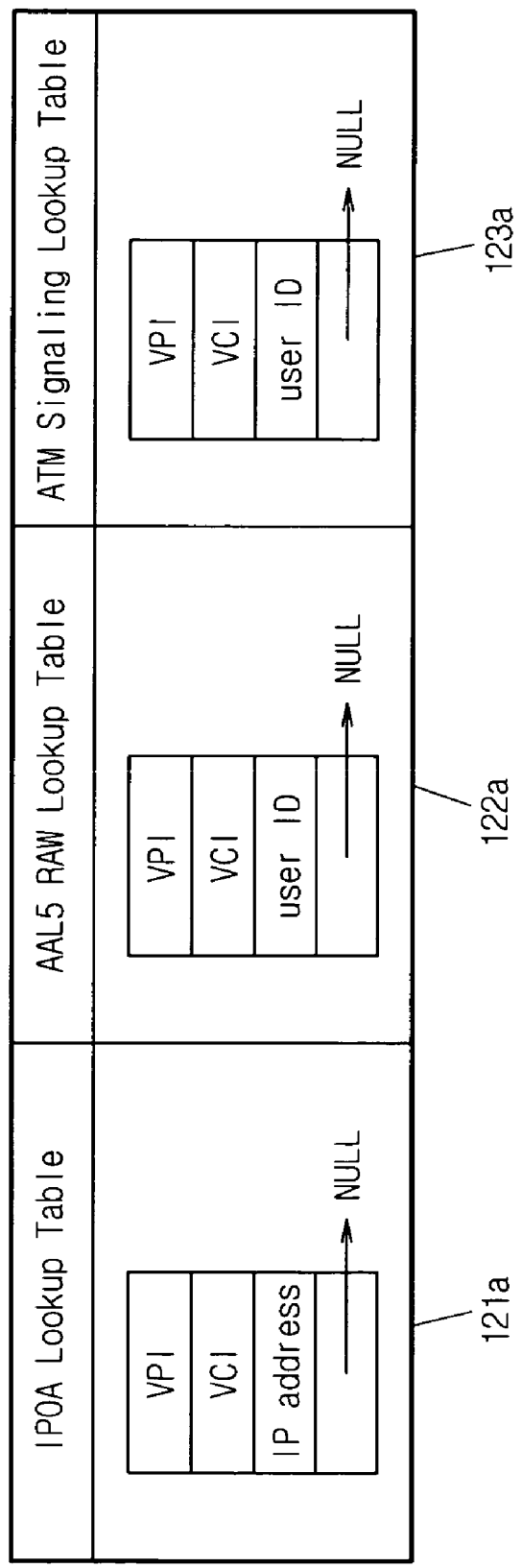
FIG. 4 illustratively shows an exemplary configuration of a lookup table.

Exemplary FIG. 3 illustrates a structure of an ATM AAL5 layer in accordance with embodiments of the present invention. ATM AAL5 layer 120 may include a plurality of SAPs. Each respective SAP may include at least one of a lookup table (121a, 122a, 123a), an lookup table initializing part (121b, 122b, 123b), an lookup table updating part (121c, 122c, 123c), and an lookup table retrieving part (121d, 122d, 123d). During initialization NIU 100, lookup table initializing part (121b, 122b, 123b) may initialize a corresponding lookup table (121a, 122a, 123a), as illustrated in exemplary FIG. 4. When an ATM channel is opened according to a request of an upper protocol or an application program layer, lookup table updating part (121c, 122c, 123c) may insert a node of the opened channel into a lookup table of a corresponding SAP. When an ATM channel is closed, lookup table updating part (121c, 122c, 123c) may delete a node of a corresponding channel from a lookup table. By deleting a node, lookup table updating part (121c, 122c, 123c) may update lookup table (121a, 122a, 123a) of a respective SAP (131, 132, 133). Lookup table retrieving part (121d, 122d, 123d) may sequentially retrieve nodes of lookup table (121a, 122a, 123a) included in a respective SAP by using the VPI/VCI of the AAL5 PDU received through an ATM SAR driver as a key value. Lookup table (121a, 122a, 123a) may check a SAP to which a received AAL5 PDU is routed.

Figure 5:
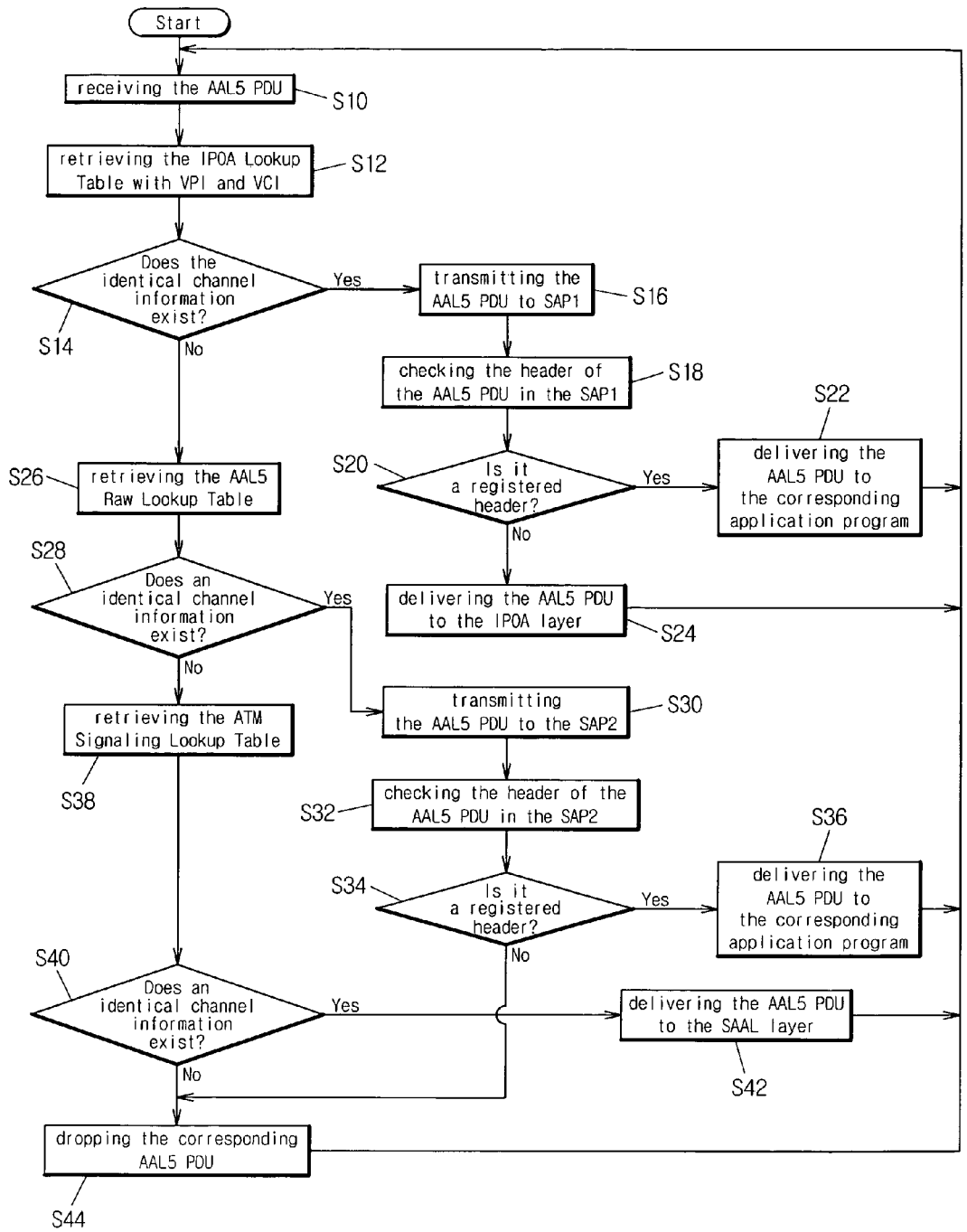
FIG. 5 is a flowchart showing an exemplary method for routing an AAL5 PDU in a mobile communication system.

FIG. 5 is an exemplary flowchart illustrating a method for routing a AAL5 PDU in a mobile communication system according to embodiments of the present invention. ATM AAL5 layer 120 may receive an ATM cell through ATM PHY/SAR layer 110 and convert the received ATM cell into AAL5 PDU format. ATM PHY/SAR layer 110 may retrieve IPOA lookup table 121a by using VPI and/or VCI. VPI and/or VCI may be ATM channel information of a AAL5 PDU and may represent a key value. ATM PHY/SAR layer 110 may decide whether ATM channel information identical to ATM channel information (VPI and/or VCI), if an AAL5 PDU exists in IPOA lookup table 121a (S10, S12, S14).

In block S14 of FIG. 5, if it is determined that ATM channel information identical to ATM channel information (e.g. VPI and/or VCI) of a AAL5 PDU exists in the IPOA lookup table 121a, then the AAL5 PDU is delivered to SAP1 131 (S16). The SAP1 131 which may receive a AAL5 PDU in block S16, may check header information of a received AAL5 PDU. SAP1 131 may determine if a header of a received AAL5 PDU is a registered header (S18, S20). In block S20, if it is determined that a header of a received AAL5 PDU is a registered header, then the received AAL5 PDU may be delivered to a corresponding application program (S22). If it is determined that a received AAL5 PDU is a non-registered header, then the received AAL5 PDU may be delivered to an IPOA layer (S24). In block S14, if it is determined that ATM channel information identical to ATM channel information (e.g. VPI and/or VCI) of an AAL5 PDU does not exist in IPOA lookup table 121a, then an AAL5 Raw lookup table 122a may be retrieved (S26). It is determined if ATM channel information identical to the ATM channel information (e.g. VPI and/or VCI) of an AAL5 PDU exists in AAL5 Raw lookup table 122a (S28).

In block S28, if it is determined that ATM channel information identical to ATM channel information (e.g. VPI and/or VCI) of an AAL5 PDU exists in AAL5 Raw lookup table 122a, AAL5 PDU may be delivered to SAP2 132 (S30). SAP2 132, which may have received an AAL5 PDU in block S30, may check header information of the received AAL5 PDU and may determined if a header of the received AAL5 PDU is a registered header (S32, S34). In block S34, if it is determined that a header of a received AAL5 PDU is a registered header, then the received AAL5 PDU may be delivered to a corresponding application program (S36). If it is determined that a header of the received AAL5 PDU is a non-registered header, the received AAL5 PDU may be dropped (S44).

In block S28, if it is determined that ATM channel information identical to ATM channel information (e.g. VPI and/or VCI) of an AAL5 PDU does not exist in AAL5 Raw lookup table 122a, ATM signaling lookup table 123a may be retrieved (S38). It may be determined whether ATM channel information identical to ATM channel information (e.g. VPI and/or VCI) of a AAL5 PDU exists in ATM signaling lookup table 123a (S40). In block S40, if it is determined that ATM channel information identical to ATM channel information (e.g. VPI and/or VCI) of an AAL5 PDU exists in ATM signaling lookup table 123a, the AAL5 PDU may be delivered to a SAAL layer via SAP3 133 (S42).

In block S40, if it is determined that ATM channel information identical to ATM channel information (e.g. VPI and/or VCI) of an AAL5 PDU does not exist in ATM signaling lookup table 123a, the AAL5 PDU may be dropped (S44). In accordance with embodiments of the present invention, ATM AAL5 layer may comprise lookup tables including a single connection list in each respective SAP for an upper layer. When routing a AAL5 PDU, lookup tables provided in SAPs may be sequentially retrieved, and then a corresponding AAL5 PDU may be delivered to the respective SAP. If a new ATM AAL5 upper layer is generated, a corresponding lookup table may be required. Accordingly, it may be required to have special modules for initializing, updating and retrieving a corresponding lookup table. Thereby, additional memory may be required for a lookup table. Further, when routing an AAL5 PDU, since a lookup table retrieving part may have to sequentially retrieve each lookup table using the VPI and/or VCI, there may be some time delay.

Embodiments of the present invention relates to an apparatus and/or method for routing an AAL5 Protocol Data Unit (PDU) in a mobile communication system. Embodiments are capable of routing a AAL5 PDU using a hash lookup table in the mobile communication system, which uses ATM as an internal network protocol.

Figure 6:
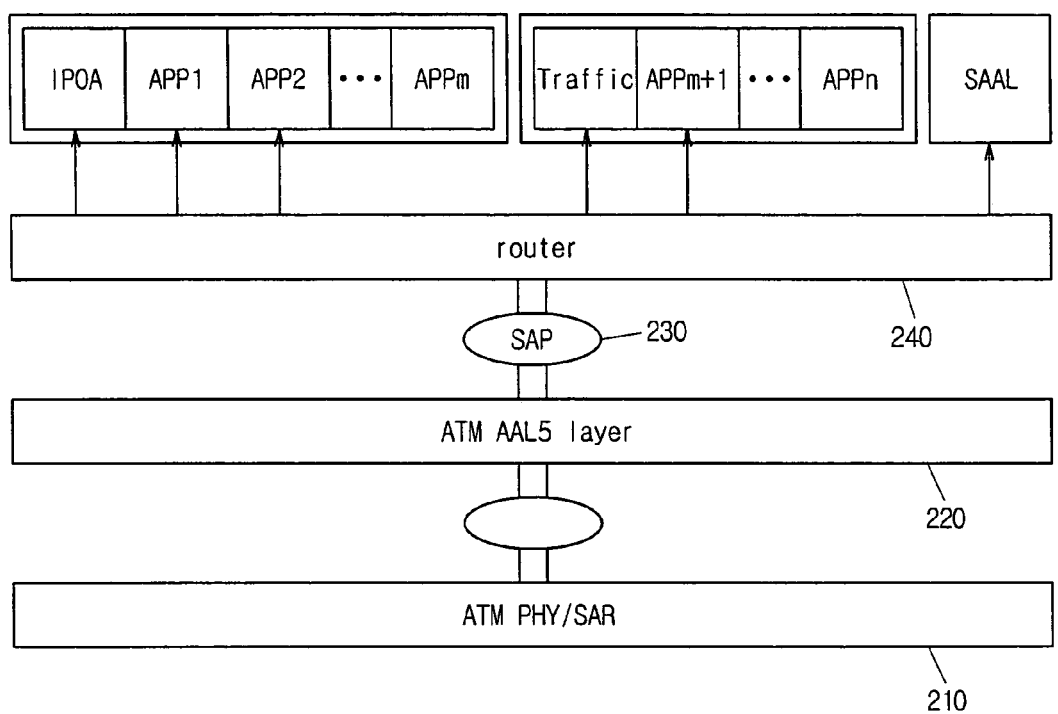
FIG. 6 illustratively shows an exemplary apparatus for routing an AAL5 PDU in a mobile communication system.

Exemplary FIG. 6 illustrates an apparatus for routing an AAL5 PDU in a mobile communication system, according to embodiments of the present invention. A mobile communication system comprises at least one of ATM PHY/SAR layer 210, ATM AAL5 layer 220, SAP 230, router 240, and a plurality of upper layers. ATM PHY/SAR layer 210 may perform transmitting/receiving ATM cells and/or separating/coupling ATM cells. ATM AAL5 layer 220 may format an ATM cell received from ATM PHY/SAR layer 210 to the size of an AAL5 PDU. ATM AAL5 layer 220 may transmit and/or receive an AAL5 PDU to and/or from an application program of an upper layer. In embodiments, a single SAP (e.g. SAP 230) may deliver an AAL5 PDU received from ATM AAL5 layer 220 to router 240, in order to deliver it to an application program of an upper layer.

Router 240 may include a hash lookup table for sorting an AAL5 PDU according to a hash value of a channel code of the AAL5 PDU. Hashing may be a small mathematical summary or digest of an original clear-text data file or message. For example, a hashing function may take a variable-length message input and produce a fix-length hash output. Resulting hashes may be stored in Hash buckets in a Hash table. A hash table may be indexed in such a way as to speed the process of sorting through the table to find a specific hash. A hashing function may be an algorithm that takes its input in an original message and provides a fix-length summary of that message. In embodiments, in order for a hashing function to be effective, the result (e.g. message digest) must be unique to the original message, with an acceptable range of certainty. When router 240 receives an AAL5 PDU from ATM AAL5 layer 220 via SAP 230, it may retrieve channel information from a hash lookup table to distribute the received AAL5 PDU to an application program of an upper layer.

A channel code may be an identifier allocated to each of the channels provided on an ATM chip. In embodiments, a channel code may have a value between 0 and 65535. In embodiments of the present invention, a channel code may include at least one of a virtual channel identifier (VCI) and a virtual path identifier (VPI). In embodiments, the VCI is an address or label of a virtual channel. The VCI may be a unique numerical tag, defined by a 16 bit field in an ATM header, that identifies a virtual channel over which a stream of cells uses to travel during a course of a session between devices. In embodiments, a VPI is an 8-bit field in an ATM cell header which indicates a virtual path of which a cell should be routed.

Figure 7:
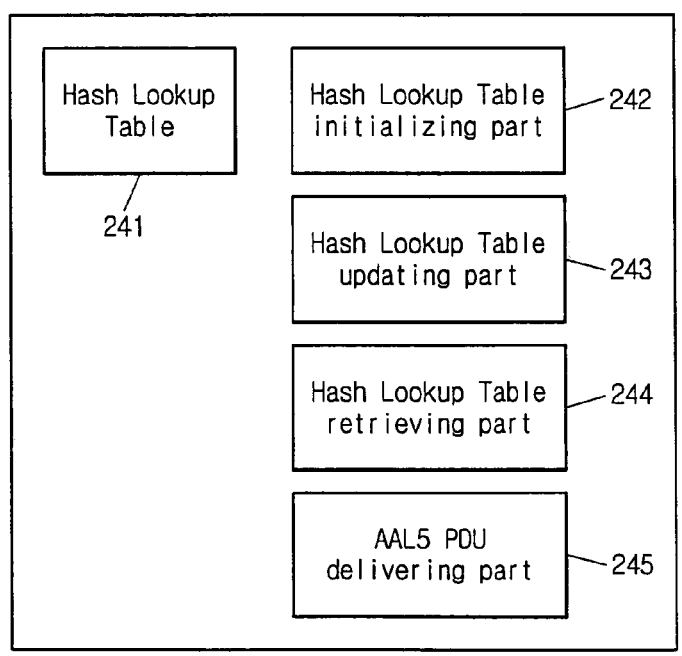
FIG. 7 is a view illustrating an exemplary configuration of a router.
Figure 8:
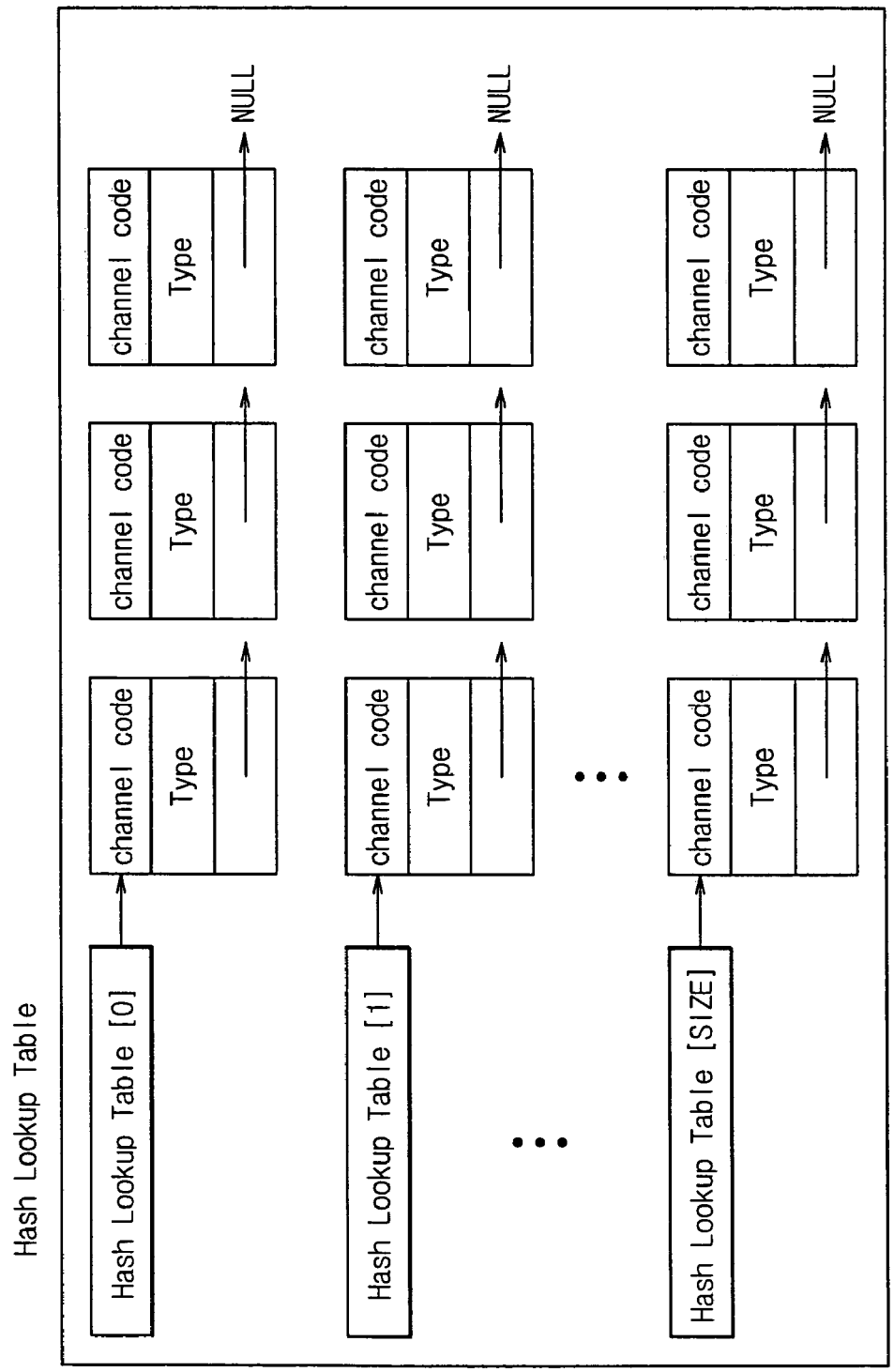
FIG. 8 illustrates an exemplary configuration of a Hash lookup table.

Router 240, as illustrated in exemplary FIG. 7, may comprise at least one of hash lookup table 241, hash lookup table initializing part 242, hash lookup table updating part 243, hash lookup table retrieving part 244, and AAL5 PDU delivering part 245. Hash lookup table 241, as illustrated in exemplary FIG. 8, may consist of a plurality of buckets according to the size of a hash lookup table. Hash lookup table 241 may be organized according to hash values. For example, if the size of hash lookup table 241 is 10, Hash values may be one of 0, 1, 2, 3, 4, 5, 6, 7, 8, and 9. In this example, Hash lookup table 241 comprises 10 buckets.

In embodiments, buckets may represent channels having identical hash values. Hash values may be generated from a hash function by dividing a channel code by the size of a hash lookup table. Channel information of channels having identical hash values may be associated with each of the buckets. For example, channels having a remainder of zero may be associated to a bucket having 0 as the hash value. A remainder of zero may be determined by dividing a channel code by a size of hash lookup table 241 (e.g. the channels having a channel code value of 0, 10, 20, 30, . . . ). In this example, a bucket having 1 as the Hash value may be associated with channels having a remainder of 1 (e.g. the channels having a channel code value of 1, 11, 21, 31, . . . ). Each bucket may include a single chaining connection list of channels having identical remainder values. Each bucket may be arrayed as "bucket[0], bucket[1], bucket[2], . . . , bucket[9]", and the index of the array (0, 1, 2, 3, . . . , 9) is a hash value.

In embodiments, when a NIU is initialized, hash lookup table initializing part 242 may initialize a hash table to the size of a hash lookup table. A channel code provided by an ATM chip may be used as a key value of the hash lookup table. A remainder value, after dividing a channel code by the size of a hash lookup table, may be used as a hash value.

In embodiments, when an ATM channel is opened according to a request from an upper protocol or application program layer, hash lookup table updating part 243 may determine which bucket the opened channel will be inserted. This determination may utilize a remainder after dividing a channel code of an opened channel by the size of a hash lookup table as the hash value. Hash lookup table updating part 243 may insert a channel code and a type of the opened channel into the bucket to update hash lookup table 241. The type of an opened channel may be indicative of a type of upper ATM AAL5 protocol layer. Based on the type, routing type of the opened channel will become apparent (e.g. whether the opened channel is being used in many application programs or not). When an ATM channel is closed, hash lookup table updating part 243 may determine which bucket a closed channel is registered, by using a remainder after dividing the channel code of the closed channel by the size of a hash lookup table as the hash value. Hash lookup table updating part 243 may retrieve the determined bucket and may delete the channel code of the closed channel if there is a channel code identical to the channel code of the closed channel, thereby updating hash lookup table 241.

For example, when a channel having a channel code of 53 is newly opened, hash lookup table updating part 243 may divide the channel code (e.g. 53) by the size of the Hash lookup table 241 (e.g. 10). Hash lookup table updating part 243 may determine the bucket of the Hash lookup table having a Hash value of 3 as a bucket into which the channel having the channel code of 53 is inserted, by using the remainder (e.g. 3) as a Hash value. Hash lookup table inserting part 243 may insert channel information of the channel having a channel code of 53 into the end of the determined bucket. When a channel having a channel code of 31 is closed, hash lookup table updating part 243 may divide the channel code (e.g. 31) by the size of the hash lookup table 241 (e.g. 10). Hash lookup table updating part 243 may determined a bucket of a hash lookup table having a hash value of 1 for inserting a the channel having a channel code of 31. This determination may utilize a remainder (e.g. 1) as a Hash value. Hash lookup table inserting part 243 may determine if there is a channel having a channel code of 31 in the determined bucket and may delete the channel code of 31 if the channel code of 31 is closed.

In embodiments, when hash lookup table retrieving part 244 may receive an AAL5 PDU from ATM AAL5 layer 220. Hash lookup table retrieving part 244 may determine a bucket to be retrieved by using a hash value. Hash lookup table retrieving part 244 may retrieve a channel having the identical channel code from the determined bucket. In embodiments, as a result of retrieval of the determined bucket, when there is a channel having an identical channel code, Hash lookup table retrieving part 244 may increase a counter value of the channel. If the channel is not a first channel located at the foremost of the determined bucket, Hash lookup table retrieving part 244 may compare the counter value of the channel with a counter value of the first channel of the determined bucket. Hash lookup table retrieving part 244 may change the channel to the first channel of the determined bucket if the counter value of the channel is greater than that of the first channel. Therefore, in embodiments, faster routing is possible.

In embodiments, a particular hash function may be used to determine an item of a Table having a desired key value. The key value may be directly changed to an address of the item during a retrieval process, thereby facilitating fast retrieval. A hash function may include at least one of a midsqare function, a division function, and a folding function. However, one of ordinary skill in the art would appreciate other functions included in a hash function. Embodiments of the present invention may use a remainder after dividing the key value by the size of a hash lookup table (i.e. the key value/the size of the Hash lookup Table) as a bucket address by making use of a division function. In embodiments related to solving overflow problems, channel codes entered into the same bucket may be stored as a connection list.

In embodiments, AAL5 PDU delivering part 245 may confirm the type of the channel code retrieved from hash lookup table retrieving part 244, so that a similar application group can be identified to which a AAL5 PDU is to be routed. AAL5 PDU delivering part 245 may check a header of an AAL5 PDU, so that the kind of application program receiving the AAL5 PDU may be identified. AAL5 PDU delivering part 245 may call a reception (Rx) processing function which is registered correspondingly to the identified application program and may deliver a AAL5 PDU to that application program.

Figure 9:
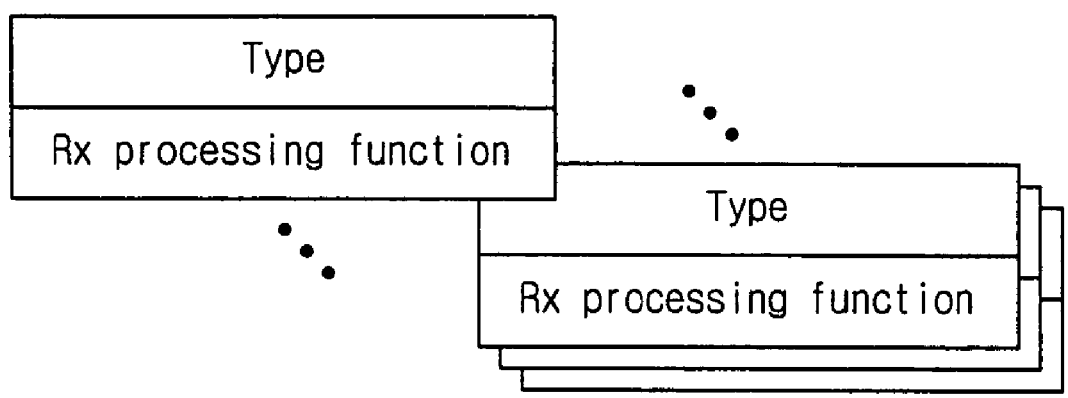
FIG. 9 illustrates an exemplary arrangement of a structure for routing a multi-application program.

FIG. 9 is an exemplary view illustrating an arrangement of a structure for routing a multi-application program in the same channel, in accordance with embodiments of the present invention. The kind of the application program may be the type. A Rx processing function may be matched and registered in each type. A Rx processing function to be used when routing a AAL5 PDU to application programs may depend on the header content of the AAL5 PDU in the same channel. A Rx processing function may depend on an operative routing Table depending on the kind of the AAL5 PDU For example, AAL5 PDU Type 1 (header: 0x00000000)→routing to A Function AAL5 PDU Type 2 (header: 0x00000001)→routing to B Function AAL5 PDU Type 3 (header: 0x00000002)→routing to C Function AAL5 PDU Type 4 (header: 0x00000003)→routing to D Function AAL5 PDU Type 5 (header: 0x00000004)→routing to E Function Types may be dynamically stored as required. For example, a PDU having a header of 0x00000000 may be stored as Type 1 and a PDU having a header of 0x00000001 may be stored as Type 2.

Figure 10:
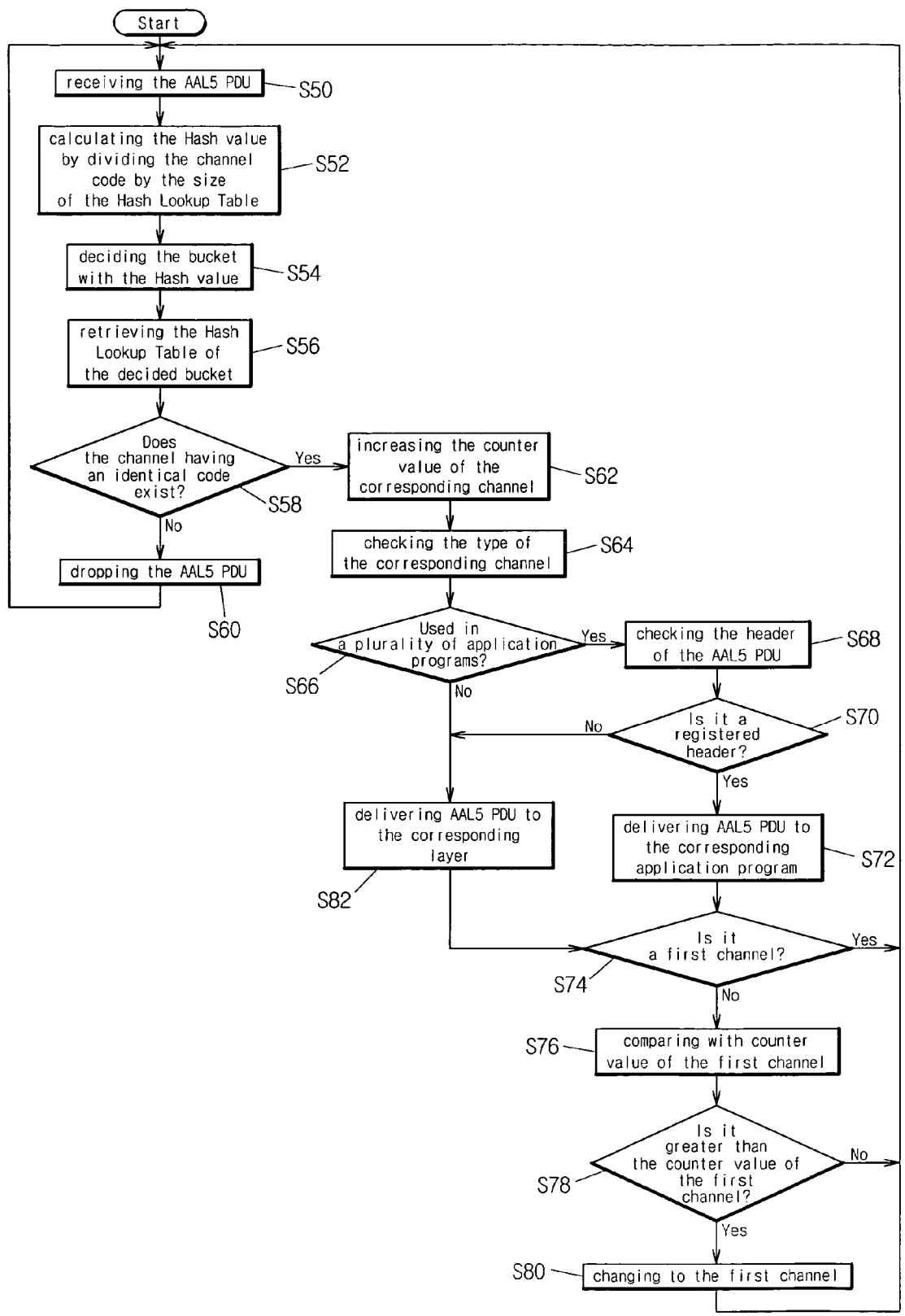
FIG. 10 is a flowchart illustrating an exemplary method for routing an AAL5 PDU in a mobile communication system.

FIG. 10 is an exemplary flowchart illustrating a method of routing an AAL5 PDU in a mobile communication system, according to embodiments of the present invention. A hash lookup table may be constructed such that it uses a remainder after dividing a channel code provided by an ATM chip by a size of hash lookup table 241 as a hash value. Hash lookup table 241 may be initialized to a preset size as a NIU is initialized.

In embodiments, when an ATM channel is opened according to a request of an upper application program and/or protocol layer, a bucket may be determined by using a remainder after dividing a channel code of the opened channel by the size of a hash lookup table as a hash value. Hash lookup table 241 may be updated by inserting a channel code and a type of the opened channel into the determined bucket. When an ATM channel is closed, a bucket may be determined by using a remainder after dividing the channel code of the closed channel by the size of the Hash lookup table as the Hash value. As a result of the retrieval of the determined bucket, if there is a channel code identical to the channel code, then the channel code is deleted, thereby hash lookup table 241 is updated.

ATM AAL5 layer 220, which may receive the ATM cell via ATM PHY/SAR layer 210, may convert a received ATM cell into the size according to AAL5 PDU format. ATM AAL5 layer 220 may deliver an ATM cell to router 240 via SAP 230. Router 240 which may receive an AAL5 PDU from ATM AAL5 layer 220 via SAP 230 may execute a hash function by dividing a channel code provided by an ATM chip by the size of a hash lookup table, thereby calculating a hash value (S50, S52).

A bucket to which a channel code belongs may be determined by using a hash value calculated in block S52. Hash lookup table of the determined bucket may be retrieved. It may be determined if there is a channel having an identical channel code (S54, S56, S58). In block S58, if it is determined that a channel having an identical channel code does not exist, then a received AAL5 PDU is dropped (S60). If it is determined in block S58 that a channel having the identical channel code exists, a counter value of the channel may be increased (S62). A type of a channel may be checked (S64). The routing type of the channel may be determined, (e.g. determine if the channel is a channel being used in a plurality application programs) (S66).

In block S66, if it is determined that a channel is a channel being used in a plurality of application programs, a header of a received AAL5 PDU may be retrieved (S68). It may be determined if a header of a received AAL5 PDU is a registered header (S70). In block S70, if it is determined that a header of a received AAL5 PDU is a registered header, Rx processing function (registered correspondingly to the header type of the received AAL5 PDU) may be called. AAL5 PDU may be delivered to a corresponding application program (S72). It may be determined whether a channel is a first channel (S74). In step S74, if it is determined that a channel is a first channel, then block S50 may be performed. Routing an AAL5 PDU to be received subsequently may be performed. If a channel is not a first channel, a counter value of the channel and a counter value of the first channel are compared (S76). It may be determined if a counter value of a channel is greater than that of a first channel (S78).

In embodiments, in block S78, if it is determined that a counter value of a channel is greater than that of a first channel, then the channel is converted into the first channel (S80) and the process proceeds to block S50, thereby routing an AAL5 PDU to be received is subsequently performed. In block S78, if it is determined that a counter value of a channel is not greater than that of a first channel, the process proceeds to block S50, thereby routing an AAL5 PDU to be received.

In embodiments, in block S70, if it is determined that a header of a received AAL5 PDU is not a registered header, then the received AAL5 PDU is delivered to a corresponding layer (S82) and the process proceeds to block S74. If a channel is a first channel, the process is repeatedly performed. If a channel is not a first channel, then the counter values are compared, thereby the channel may be changed to the first channel if the counter value of the channel is greater than that of the first channel.

In embodiments, in block S66, if it is determined that a channel is a channel being used in a single application program rather than in many application programs, a received AAL5 PDU may be delivered to a layer in which an application program exists (S82) and the process proceeds to block S74. If a channel is not a first channel, then counter values are compared, thereby the channel may be changed to a first channel if a counter value of the channel is greater than that of the first channel.

In an apparatus and method for routing AAL5 PDU in a mobile communication system according to embodiments of the invention, a Hash lookup table using a remainder value after dividing the channel code, which is a channel identifier provided by the ATM chip, by the size of the Hash lookup table as the Hash value is constructed, and the channels having the identical Hash value are connected by the buckets. When the AAL5 PDU is received, the bucket to be retrieved is decided with the Hash value obtained by the Hash function of dividing the channel code by the size of the Hash lookup table. If there is the identical channel code in the bucket, then the type of the channel is checked, and the AAL5 PDU is routed. Accordingly, embodiments of the present invention are capable of reducing the retrieval time and the memories due to managing the only one Hash lookup table. Also, the retrieval time of the Hash lookup table may be reduced by changing the channel, which receives frequently the AAL5 PDU, to a first node of the bucket. In addition, when a single channel is used in many application programs, the header of the received AAL5 PDU is checked. As a result of the check, if the header of the AAL5 PDU was registered, the Rx processing function registered correspondingly to the type of the header is called, and thus the received AAL5 PDU is delivered to the corresponding application program. Accordingly, the dynamic routing to many application programs can be provided, and it is easy to use a variety of application programs.

The object of embodiments of the present invention is to provide an apparatus and method for routing an AAL5 PDU in a mobile communication system, being capable of rapidly routing the AAL5 PDUs of a great deal of multi-channels to an upper layer by making use of a Hash lookup table using a channel code, which is a channel identifier, as a key value. An object of embodiments of the invention is to provide a dynamic routing function to many application programs being used in a channel.

In order to accomplish objects of embodiments of the present invention, there is provided an apparatus for routing the AAL5 PDU in a mobile communication system, comprising a router, wherein the router contains a Hash lookup table using a remainder after dividing a channel code provided by a ATM chip by a size of the Hash lookup table as a Hash value, and when the router receives the AAL5 PDU from an ATM AAL5 layer via a single service access point, it retrieves channel information from the Hash lookup table with a channel code of the received AAL5 PDU, thereby routing the received AAL5 PDU to an upper application program and protocol layer.

In embodiments, the router comprises a Hash lookup table consisting of a plurality of buckets using a remainder after dividing the channel code provided by the ATM chip by the size of the Hash lookup table as the Hash value; a Hash lookup table initializing part for initializing the Hash lookup table to a preset size of the Hash lookup table when a network interface unit is initialized; a Hash lookup table updating part which, when the ATM channel is opened, inserts a channel code of the opened channel into the Hash lookup table and which, when an ATM channel is closed, deletes a channel code of the closed channel from the Hash lookup table; a Hash lookup table retrieving part which, when the AAL5 PDU is received, decides which the bucket will be retrieved from the Hash lookup table by using a remainder after dividing the channel code provided by the ATM chip by the size of the Hash lookup table as the Hash value, and retrieves a channel having an identical channel code from the decided bucket; and an AAL5 PDU delivering part which confirms a type of the channel retrieved in the Hash lookup table retrieving part, so that when the confirmed channel is a channel being used in many application programs, it checks a header of the AAL5 PDU, and then when the checked header of the AAL5 PDU is a registered header, it calls a reception processing function corresponding to the AAL5 PDU header type, thereby delivering the AAL5 PDU to a corresponding application program.

In embodiments, the Hash lookup table consists of a plurality of buckets which use the channel code, which is a channel identifier provided by the ATM chip, as a key value, and a remainder after dividing the channel code by the size of the Hash lookup table as a Hash value. In embodiments, each of the buckets consists of a single chaining connection list to which is connected the channel information of the channels having a Hash value identical to that of the respective bucket. In embodiments, the channel information comprises the channel code, which is a channel identifier provided by the ATM chip, and a type information indicating the routing type of the corresponding channel.

In embodiments, the Hash lookup table retrieving part is constructed such that when a channel having the identical channel code exists in the decided bucket, it increases a count value of the channel, and when the channel is not a first channel located at the foremost of the decided bucket, it compares the count value of the channel with a count value of the first channel of the decided bucket, thereby changing the channel to the first channel of the decided bucket if the count value is greater than that of the first channel.

In embodiments, the Hash lookup table updating part decides the bucket into which the opened channel will be inserted, by using a remainder after dividing the channel code of the opened channel by the size of the Hash lookup table as the Hash value, then inserts the channel information of the opened channel into the bucket, and also decides the bucket in which the closed channel is registered, by using a remainder after dividing the channel code of the closed channel by the size of the Hash lookup table as the Hash value, then retrieves and deletes the channel information of the closed channel from the bucket.

Embodiments relate to a method for routing an AAL5 PDU in a mobile communication system according to one embodiment of the invention, comprising the processes of constructing a Hash lookup table using a remainder after dividing a channel code provided by an ATM chip by a size of the Hash lookup table as a Hash value; initializing the Hash lookup table to a preset size as a network interface unit is initialized; inserting channel information of a channel which is opened according to a request of an upper application program and protocol layer, into the Hash lookup table by using a Hash function, and deleting channel information of a channel which is closed according to a request of the upper application program and protocol layer, from the Hash lookup table by using the Hash function, thereby updating the Hash lookup table; executing the Hash function using the channel code of the AAL5 PDU as a key value as the AAL5 PDU is received, calculating a Hash value, and retrieving a channel having a channel code identical to the channel code from a bucket decided in the Hash lookup table by using the calculated Hash value; deciding a routing type of the channel by checking a type of the retrieved channel, thereby routing the AAL5 PDU depending on the decided routing type.

In embodiments, the retrieving process comprises the steps of executing the Hash function of dividing the channel code of the AAL5 PDU by the size of the Hash lookup table, thereby calculating the Hash value; deciding the bucket to be retrieved from the Hash lookup table by using the calculated Hash value; retrieving a channel having a channel code identical to the channel code from the decided bucket; if there is a channel having the identical channel code as the result of the retrieval, checking the channel type, thereby deciding a routing type of the channel; and delivering the AAL5 PDU to the upper application program and protocol layer depending on the decided routing type.

In embodiments, the updating process comprises the steps of, if the ATM channel is opened according to a request of the upper application program and protocol layer, deciding the bucket by using a remainder after dividing a channel code of the opened channel by the size of the Hash lookup table as the Hash value; inserting the channel information of the channel into the bucket; if the ATM channel is closed, deciding the bucket by using a remainder after dividing a channel code of the closed channel by the size of the Hash lookup table as the Hash value; and retrieving and deleting a channel code identical to the channel code from the bucket.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for routing an AAL5 PDU to an upper application program or a protocol layer via a plurality of service access points in a mobile communication system, comprising a router that contains a Hash lookup table having a plurality of buckets, wherein when the router receives the AAL5 PDU from an ATM AAL5 layer via a single service access point, the router retrieves channel information from the Hash lookup table based on a channel code of the received AAL5 PDU and routes the received AAL5 PDU to the upper application program or the protocol layer, wherein the router includes:
a Hash lookup table updating part that determines in which bucket an opened channel will be inserted based on a remainder used as a hash value, the remainder obtained by dividing a channel code of the opened channel by a size of the Hash lookup table, the opened channel provided by an ATM chip;
a Hash lookup table retrieving part that, when the AAL5 PDU is received, decides which bucket will be retrieved from the Hash lookup table and retrieves a channel having an identical channel code from the decided bucket; and
an AAL5 PDU delivering part that confirms a type of the channel retrieved in the Hash lookup table retrieving part, so that when the confirmed channel is a channel being used in one or more application programs, a header of the AAL5 PDU is checked, and then when the checked header of the AAL5 PDU is a registered header, a reception processing function corresponding to the AAL5 PDU header type is called, thereby delivering the AAL5 PDU to a corresponding application program.

2. The apparatus of claim 1, wherein one or more of the plurality of buckets of the hash lookup table use the channel code, which is a channel identifier provided by the ATM chip, as a key value.

3. The apparatus of claim 2, wherein each of the buckets includes a single chaining connection list to which is connected the channel information of channels having a Hash value identical to that of the respective bucket.

4. The apparatus of claim 1, wherein if the channel having the identical channel code exists in the decided bucket, the Hash lookup table retrieving part increases a counter value of a channel, and
if the channel is not the first channel located at a foremost of the decided bucket, the Hash lookup table retrieving part compares the counter value of the channel with a counter value of a first channel of the decided bucket, thereby changing the channel to the first channel of the decided bucket if the counter value is greater than that of the first channel.

5. The apparatus of claim 1, wherein the router further comprises a Hash lookup table initializing part for initializing the Hash lookup table to a preset size of the Hash lookup table when a network interface unit is initialized.

6. The apparatus of claim 1, wherein Hash lookup table updating part inserts the channel code of the opened channel into the Hash lookup table when an ATM channel is opened, and which deletes a channel code of a closed channel from the Hash lookup table when an ATM channel is closed.

7. The apparatus of claim 6, wherein the Hash lookup table updating part decides the bucket in which the closed channel is registered, by using a hash value which is based on a remainder obtained after dividing the channel code of the closed channel by the size of the Hash lookup table, then retrieves and deletes the channel information of the closed channel from the bucket.

8. The apparatus of claim 1, wherein the channel information comprises:
a channel code, which is a channel identifier provided by the ATM chip; and
a type information indicating a routing type of the corresponding channel.

9. A method for routing an AAL5 PDU in a mobile communication system comprising:
constructing a Hash lookup table based on a hash value that corresponds to a remainder obtained after dividing a channel code provided by an ATM chip by a size of the Hash lookup table;
executing a Hash function using a channel code of the AAL5 PDU as a key value as the AAL5 PDU is received, calculating a Hash value, and retrieving a channel having a channel code identical to the channel code from a bucket decided in the Hash lookup table by using the calculated Hash value; and
deciding a routing type of the channel by checking a type of the retrieved channel, and thereby routing the AAL5 PDU depending on the decided routing type, wherein the retrieving comprises:
executing the Hash function of dividing the channel code of the AAL5 PDU by the size of the Hash lookup table, thereby calculating the Hash value;
deciding the bucket to be retrieved from the Hash lookup table by using the calculated Hash value;
retrieving a channel having a channel code identical to the channel code from the decided bucket;
if there is a channel having the identical channel code as the result of the retrieval, checking the channel type, thereby deciding a routing type of the channel; and
delivering the AAL5 PDU to the upper application program and protocol layer depending on the decided routing type.

10. The method of claim 9, further comprising initializing the Hash lookup table to a preset size as a network interface unit is initialized.

11. The method of claim 9, further comprising inserting channel information of a channel which is opened according to a request of an upper application program and protocol layer, into the Hash lookup table by using the Hash function, and deleting channel information of a channel which is closed according to a request of the upper application program and protocol layer, from the Hash lookup table by using the Hash function, thereby updating the Hash lookup table.

12. The method of claim 11, wherein the updating comprises:
if the ATM channel is opened according to a request of the upper application program and protocol layer, deciding the bucket by using a remainder after dividing a channel code of the opened channel by the size of the Hash lookup table as the Hash value;
inserting the channel information of the channel into the bucket;

if the ATM channel is closed, deciding the bucket by using a remainder after dividing a channel code of the closed channel by the size of the Hash lookup table as the Hash value; and retrieving and deleting a channel code identical to the channel code from the bucket.

13. A method for routing an AAL5 PDU in a mobile communication system comprising:

constructing a Hash lookup table based on a hash value that corresponds to a remainder obtained after dividing a channel code provided by an ATM chip by a size of the Hash lookup table;

executing a Hash function using a channel code of the AAL5 PDU as a key value as the AAL5 PDU is received calculating a Hash value, and retrieving a channel having a channel code identical to the channel code from a bucket decided in the Hash lookup table by using the calculated Hash value; and deciding a routing type of the channel by checking a type of the retrieved channel, and thereby routing the AAL5 PDU depending on the decided routing type, wherein the retrieving further comprises:

if there is a channel having the identical channel code as a result of the retrieval, increasing a count value of the channel, and deciding whether the channel is a first channel of the bucket or not;

if it is decided that the channel is not the first channel as a result of the decision, comparing the counter value of the channel with a counter value of the first channel of the bucket, thereby deciding whether the counter value of the channel is greater than that of the first channel; and if it is decided that the counter value of the channel is greater than that of the first channel as a result of the decision, changing the channel to the first channel.

14. A method for routing an AAL5 PDU in a mobile communication system comprising:

constructing a Hash lookup table based on a hash value that corresponds to a remainder obtained after dividing a channel code provided by an ATM chip by a size of the Hash lookup table;

executing a Hash function using a channel code of the AAL5 PDU as a key value as the AAL5 PDU is received calculating a Hash value, and retrieving a channel having a channel code identical to the channel code from a bucket decided in the Hash lookup table by using the calculated Hash value; and deciding a routing type of the channel by checking a type of the retrieved channeL and thereby routing the AAL5 PDU depending on the decided routing type, wherein the retrieving further comprises:

if the decided routing type of the channel is a type being used in many application programs, checking a header of the AAL5 PDU, thereby deciding whether the header of the AAL5 PDU is a registered header; and if it is decided that the header of the AAL5 PDU is a registered header as a result of the decision, calling a reception processing function which is registered correspondingly to the header of the AAL5 PDU, thereby routing the AAL5 PDU.

15. A method for routing an AAL5 PDU in a mobile communication system comprising:

constructing a Hash lookup table based on a hash value that corresponds to a remainder obtained after dividing a channel code provided by an ATM chip by a size of the Hash lookup table;

executing a Hash function using a channel code of the AAL5 PDU as a key value as the AAL5 PDU is received calculating a Hash value, and retrieving a channel having a channel code identical to the channel code from a bucket decided in the Hash lookup table by using the calculated Hash value; and deciding a routing type of the channel by checking a type of the retrieved channel, and thereby routing the AAL5 PDU depending on the decided routing type, wherein the retrieving further comprises, if the decided routing type of the channel is a type being used in a single application program, delivering the AAL5 PDU to the application program.

* * * * *